(12) United States Patent
Welton et al.

(10) Patent No.: US 8,555,973 B2
(45) Date of Patent: Oct. 15, 2013

(54) METHODS AND COMPOSITIONS FOR CONTROLLING FORMATION FINES AND REDUCING PROPPANT FLOW-BACK

(75) Inventors: Thomas D. Welton, Duncan, OK (US); Philip D. Nguyen, Duncan, OK (US); Ronald G. Dusterhoft, Katy, TX (US); Johnny A. Barton, Marlow, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 13/534,232

(22) Filed: Jun. 27, 2012

(65) Prior Publication Data

US 2012/0261126 A1 Oct. 18, 2012

Related U.S. Application Data

(60) Division of application No. 11/782,190, filed on Jul. 24, 2007, which is a continuation of application No. 11/178,896, filed on Jul. 11, 2005, now Pat. No. 7,318,474.

(51) Int. Cl.
*E21B 33/13* (2006.01)

(52) U.S. Cl.
USPC .......................................... 166/295; 166/278

(58) Field of Classification Search
None
See application file for complete search history.

(56) References Cited

U.S. PATENT DOCUMENTS

| | | | | |
|---|---|---|---|---|
| 5,420,174 A | * | 5/1995 | Dewprashad | 523/130 |
| 2005/0059558 A1 | * | 3/2005 | Blauch et al. | 507/203 |

OTHER PUBLICATIONS

EPON Resin 828, Technical Data Sheet, Momentive, Sep. 2005, retrieved Nov. 2, 2012 from http://www.momentive.com/Products/TechnicalDataSheet.aspx?id=3942.*

* cited by examiner

*Primary Examiner* — Angela M DiTrani
(74) *Attorney, Agent, or Firm* — Robert A. Kent; McDermott Will & Emery LLP

(57) ABSTRACT

Remedial methods of controlling particulates within a subterranean formation comprising first, placing a resin composition into an unconsolidated zone of a subterranean formation; and second, placing an aqueous tackifying treatment fluid that comprises an aqueous tackifying agent into the unconsolidated zone. The resin may be curable or noncurable. The aqueous tackifying agent is selected from the group consisting of: a charged polymer; an acrylic acid polymer; an acrylic acid ester polymer; an acrylic acid homopolymer; an acrylic acid ester homopolymer; poly(methyl acrylate); poly(butyl acrylate); poly(2-ethylhexyl acrylate); an acrylic acid ester co-polymer; a methacrylic acid derivative polymer; a methacrylic acid homopolymer; a methacrylic acid ester homopolymer; poly(methyl methacrylate); poly(butyl methacrylate); poly(2-ethylhexyl methacrylate); an acrylamido-methyl-propane sulfonate polymer; an acrylamido-methyl-propane sulfonate derivative polymer; an acrylamido-methyl-propane sulfonate co-polymer; an acrylic acid/acrylamido-methyl-propane sulfonate co-polymer; and any combination thereof.

13 Claims, No Drawings

METHODS AND COMPOSITIONS FOR CONTROLLING FORMATION FINES AND REDUCING PROPPANT FLOW-BACK

CROSS REFERENCE TO RELATED APPLICATIONS

This application is a divisional of U.S. Ser. No. 11/782,190 filed Jul. 24, 2007 and published as U.S. 2011/0011478, which is itself a continuation of U.S. patent application Ser. No. 11/178,896 filed Jul. 11, 2005 and patented as U.S. Pat. No. 7,318,474, entitled "Methods And Compositions For Controlling Formation Fines And Reducing Proppant Flow-Back," by Thomas D. Welton, et al., which is incorporated by reference herein for all purposes, from which priority is claimed pursuant to 35 U.S.C. §120.

BACKGROUND OF THE INVENTION

The present invention relates to methods and compositions for controlling the migration of particulates, (e.g., proppant and formation fines) within a portion of a subterranean formation. More particularly, the present invention relates to remedial and proactive methods (relative to a fracturing treatment) for controlling the migration of particulates in subterranean formations.

Hydraulic fracturing is a process commonly used to increase the flow of desirable fluids from subterranean formations, such as coal formations, carbonate formations, sandstone formations, shaly formations, and mixtures thereof. Traditional hydraulic fracturing operations comprise placing a viscous fracturing fluid into a portion of a subterranean formation at a rate and pressure such that fractures are formed or enhanced into the portion of the subterranean formation. The fractures tend to propagate as vertical and/or horizontal cracks located radially outward from the well bore. In such treatments, once the hydraulic pressure is released, the fractures formed will tend to close back onto themselves. To prevent this, oftentimes a particulate material, known as proppant, is placed in the fractures by suspending them in the fracturing fluid during at least a portion of the fracturing operation. The particulates are carried into created fractures and deposited therein such that when the hydraulic pressure is released the particulates act to prevent the fracture from fully closing, and thus, aid in forming conductive channels through which produced fluids may flow into the well bore. The term "propped fracture" as used herein refers to a fracture in a portion of subterranean formation that contains some proppant particulates. The term "proppant pack" refers to a collection of a mass of proppant particulates within a fracture. Without the particulate material, the fractures tend to close and reduce permeability gained by the fracturing operation. Suitable particulate materials should have sufficient compressive strength to resist crushing, but also must be sufficiently non-abrasive and non-angular to preclude cutting and imbedding into the formation.

Hydrocarbon wells are often located in subterranean zones that contain unconsolidated particulates (e.g., proppant and formation fines) that may migrate within the subterranean formation with the oil, gas, water, and/or other fluids produced by a well penetrating the subterranean formation. The presence of these unconsolidated particulates in produced fluids is disadvantageous and undesirable in that the particulates may abrade pumping and other producing equipment and reduce the fluid production capabilities of producing zones. Unconsolidated subterranean zones include those that contain loose particulates and those wherein the bonded particulates have insufficient bond strength to withstand the forces produced by the production of fluids through the zones. "Zone" as used herein simply refers to a portion of the formation and does not imply a particular geological strata or composition.

One traditional method of controlling unconsolidated particulates in zones of a subterranean formation involves placing a filtration bed containing gravel particulates near the well bore that neighbors the zone of interest. The filtration bed acts as a sort of physical barrier to the transport of unconsolidated particulates to the well bore that could be produced with the produced fluids. Typically, such so-called "gravel packing operations" involve the pumping and placement of a quantity of desired particulates into the unconsolidated formation in an area adjacent the well bore. One common type of gravel packing operation involves placing a sand control screen in the well bore and packing the annulus between the screen and the well bore with gravel of a specific size designed to prevent the passage of formation sand. The sand control screen is generally a filter assembly used to retain the gravel placed during gravel pack operation. A wide range of sizes and screen configurations are available to suit the characteristics of the gravel pack sand used. Similarly, a wide range of sizes of gravel is available to suit the characteristics of the unconsolidated particulates. The resulting structure presents a barrier to migrating sand from the formation while still permitting fluid flow. When installing the gravel pack, the gravel is carried to the annulus in the form of a slurry by mixing the gravel with a viscous fluid, often known as a "gravel pack fluid." Once the gravel is placed in the well bore, the viscosity of the fluid is reduced, and it is returned to the surface. In some gravel packing operations, commonly known as "high rate water packing operations," the viscous fluid has a lower viscosity and yet the gravel remains in suspension because the treatment occurs at a high velocity. Gravel packs act, inter alia, to stabilize the formation while causing minimal impairment to well productivity. The gravel, inter alia, acts to prevent the particulates from occluding the screen or migrating with the produced fluids, and the screen, inter alia, acts to prevent the gravel from entering the production tubing. Such packs may be time consuming and expensive to install.

Another method used to control particulates in unconsolidated formations involves consolidating unconsolidated portions of subterranean producing zones into relatively hard permeable masses by applying a resin followed by a spacer fluid and then a catalyst. Such methods may be problematic when, for example, an insufficient amount of spacer fluid is used between the application of the resin and the application of the external catalyst. In that case, the resin may come into contact with the external catalyst in the well bore itself rather than in the unconsolidated subterranean producing zone. Furthermore, there is uncertainty as to whether there is adequate contact between the resin and the catalyst. Additionally, when resin is contacted with an external catalyst an exothermic reaction occurs that may result in rapid polymerization, potentially damaging the formation by plugging the pore channels, halting pumping when the well bore is plugged with solid material, or resulting in a down hole explosion as a result of the heat of polymerization. Uniform placement of curable resin into the formations having long intervals is most desirable. However, formations often comprise a wide range of permeabilities even within a reservoir located along a well bore. As a result, completions involving resin consolidation, with conventional diversion techniques, have been applied in intervals of less than 50 feet, and more ideally, less than 30 feet. Also, using resins to consolidate long or large unconsolidated zones may not be practical due, at least in part, to the high cost of most suitable resins.

Another similar method involves applying a non-aqueous tackifying composition to the unconsolidated particulates in an effort to reduce the migration of particulates within the zone. Whereas a curable resin composition produces a hard mass, the use of a non-aqueous tackifying composition produces a more malleable consolidated mass.

Another alternative is an aqueous tackifying composition. Aqueous tackifying compositions, however, have their own problems including, but not limited to, the fact that they require external activators and surfactants for optimum performance.

SUMMARY OF THE INVENTION

The present invention relates to methods and compositions for controlling the migration of particulates, (e.g., proppant and formation fines) within a portion of a subterranean formation. More particularly, the present invention relates to remedial and proactive methods (relative to a fracturing treatment) for controlling the migration of particulates in subterranean formations.

In an embodiment, the present invention provides a remedial method of controlling particulates within a subterranean formation comprising: placing an aqueous tackifying treatment fluid into an unconsolidated zone of a subterranean formation; and placing a resin composition comprising a noncurable and/or curable resin composition into the unconsolidated zone.

In another embodiment, the present invention provides a method comprising: providing a resin composition that comprises a curable and/or a noncurable resin; placing the resin composition into a propped fracture that comprises proppant particulates; placing an aqueous tackifying treatment fluid into the propped fracture; and allowing the proppant particulates to form a permeable proppant pack.

In another embodiment, the present invention provides a proactive method of controlling particulates within a subterranean formation comprising: placing an aqueous tackifying treatment fluid before or as part of a pre-pad of a fracturing treatment; fracturing a portion of the subterranean formation to create at least a plurality of fractures in a portion of the formation; and introducing at least a plurality of resin-coated proppant particulates into a fracture created in the fracturing treatment.

The features and advantages of the present invention will be apparent to those skilled in the art. While numerous changes may be made by those skilled in the art, such changes are within the spirit of the invention.

DESCRIPTION OF PREFERRED EMBODIMENTS

The present invention relates to methods and compositions for controlling the migration of particulates, (e.g., proppant and formation fines) within a portion of a subterranean formation. More particularly, the present invention relates to remedial and proactive methods for controlling the migration of particulates in subterranean formations. Whether a particular method of this invention is "remedial" or "proactive" is determined relative to the timing of a fracturing treatment. The remedial methods are most suited for wells wherein a portion of the well has been fractured and propped. The particular type of fracturing treatment used is not relevant. The proactive methods are most suited for wells that have not yet been fractured and propped. These would include previously acidized or matrix wells. The proactive methods can be performed in conjunction with a fracturing treatment, if desired.

One of the many advantages of the present invention is that the methods eliminate the need for an activator when using curable resin compositions, which improves the flexibility and control of the operation. Another advantage is that the resultant hardened masses have better mechanical flexibility when compared to those formed with the use of curable resins.

A. The Remedial Methods of the Present Invention.

In some embodiments, the remedial methods of the present invention comprise two steps. The first step involves placing an aqueous tackifying treatment fluid into an unconsolidated zone of a subterranean formation. In this first step, the aqueous tackifying treatment fluid may disperse any loose fines within a proppant pack in a fracture, move any fines away from the fracture (or near well bore), and lock (or stabilize) the fines in place in the formation without causing damage to the permeability of the formation. This locking or stabilization is thought to immobilize the fines, and is often referred to as "fines control." In some embodiments, the aqueous tackifying treatment fluid will be placed into propped fractures within the unconsolidated zone of a subterranean formation. The second step involves placing a suitable noncurable resin composition or a curable resin composition (sometimes referred to collectively herein as a "resin composition") in substantially the same portion of the unconsolidated zone. In preferred embodiments, the noncurable resin composition or the curable resin composition will be "ultra-thin," which means it will have a low viscosity of about 1 cP to about 100 cP, preferably a viscosity of 20 cP or less, and most preferably a viscosity of 10 cP or less. The term "ultra-thin" as used herein means refers to resin compositions having a relatively low viscosity (e.g., 100 cP or less). The aqueous tackifying treatment fluid, the noncurable resin composition, and/or the curable resin composition stabilizes the mobile particulates located along the fracture faces in the unconsolidated zone into a stabilized mass. The term "stabilized mass" as used herein refers to an at least weakly consolidated structure that can withstand high flow rates but may have modest mechanical strength.

In some embodiments, the aqueous tackifying treatment fluid, the noncurable resin composition, or the curable resin composition will be injected into a propped fracture, and will at least partially consolidate the proppant particulates within the fracture to form a permeable proppant pack therein. In other embodiments, the remedial methods of controlling particulates within a subterranean formation of the present invention comprise the steps of: placing a resin composition (i.e., a curable or noncurable resin composition) into a propped fracture that comprises proppant particulates; placing an aqueous tackifying treatment fluid into the propped fracture; and allowing the proppant particulates to form a permeable proppant pack.

1. Suitable Aqueous Tackifying Treatment Fluids.

The aqueous tackifying treatment fluids used in some of the methods of this invention comprise an aqueous fluid and an aqueous tackifying agent. Additives such as scale inhibitors, breakers, solvents, and enzymes also may be added. Optionally, the aqueous tackifying treatment fluid may comprise additional components such as surfactants and/or activators. The choice of whether to include these optional components will be governed by, inter alia, the mineralogy of the formation and the composition of the resin composition used in the method.

Suitable aqueous base fluids include fresh water, salt water, brine, seawater, or any other aqueous liquid that does not adversely react with the other components used in accordance with this invention or with the subterranean formation. One should note that if the aqueous base fluid comprises a large concentration of salts, then those salts may act as an activator for the aqueous tackifying agent, which may not be desirable.

Suitable aqueous tackifying agents generally are charged polymers that comprise compounds that, when in an aqueous solvent or solution, will form a non-hardening coating (by themselves or with an activator). The aqueous tackifying agent may enhance the grain-to-grain contact between the individual particulates within the formation, helping bring about the consolidation of the particulates into a stabilized mass. Examples of aqueous tackifying agents suitable for use in the present invention include, but are not limited to, acrylic acid polymers, acrylic acid ester polymers, acrylic acid derivative polymers, acrylic acid homopolymers, acrylic acid ester homopolymers (such as poly(methyl acrylate), poly(butyl acrylate), and poly(2-ethylhexyl acrylate)), acrylic acid ester co-polymers, methacrylic acid derivative polymers, methacrylic acid homopolymers, methacrylic acid ester homopolymers (such as poly(methyl methacrylate), poly(butyl methacrylate), and poly(2-ethylhexyl methacryate)), acrylamido-methyl-propane sulfonate polymers, acrylamido-methyl-propane sulfonate derivative polymers, acrylamido-methyl-propane sulfonate co-polymers, and acrylic acid/acrylamido-methyl-propane sulfonate co-polymers, and combinations thereof. Methods of determining suitable aqueous tackifying agents and additional disclosure on aqueous tackifying agents can be found in U.S. patent application Ser. No. 10/864,061 and filed Jun. 9, 2004 and U.S. patent application Ser. No. 10/864,618 and filed Jun. 9, 2004 the relevant disclosures of which are hereby incorporated by reference. Others that may be suitable include those described in U.S. Pat. No. 5,249,627, the relevant disclosure of which is incorporated herein by reference.

Suitable surfactants may be included in the aqueous tackifying treatment fluid. The choice of whether to use a surfactant will be governed at least in part by the mineralogy of the formation. Generally, a surfactant may help facilitate coating of the fines by the treatment fluid. For instance, a hydrophobic polymer having a negative charge will preferentially attach to surfaces having a positive to neutral zeta potential and/or a hydrophillic surface. Therefore, in particular embodiments, a cationic surfactant may be included in a treatment fluid to facilitate application of the aqueous tackifying agent on the fines. As will be understood by those skilled in the art, amphoteric and zwitterionic surfactants also may be used so long as the conditions they are exposed to during use are such that they display the desired charge. For example, in particular embodiments, mixtures of cationic and amphoteric surfactants may be used. When used, the surfactant is present in an amount of from abut 0.1% to about 5% by weight of the aqueous tackifying treatment fluid.

In alternative embodiments, the treatment fluids of the present invention may be foamed. In such embodiments, the treatment fluids also comprise a gas and a foaming agent. While various gases can be utilized for foaming the treatment fluids of this invention, nitrogen, carbon dioxide, and mixtures thereof are preferred. In examples of such embodiments, the gas may be present in a treatment fluid in an amount in the range of from about 5% to about 95% by volume of the treatment fluid, and more preferably in the range of from about 20% to about 80%. The amount of gas to incorporate into the fluid may be affected by factors including the viscosity of the fluid and wellhead pressures involved in a particular application. Examples of preferred foaming agents that can be utilized to foam and stabilize the fluids of this invention include, but are not limited to, alkylamidobetaines such as cocoamidopropyl betaine, alpha-olefin sulfonate, trimethyltallowammonium chloride, C8 to C22 alkylethoxylate sulfate and trimethylcocoammonium chloride. Cocoamidopropyl betaine is especially preferred. Other suitable surfactants available from Halliburton Energy Services include: "19N™," "G-SPERSE DISPERSANT," "MORFLO® III" surfactant, "HYFLO® IV M" surfactant, "PEN-88M™" surfactant, "HC-2™ Agent," "PEN-88 HT™" surfactant, "SEM-7™" emulsifier, "HOWCO-SUDS™" foaming agent, "HOWCO STICKS™" surfactant, "A-SPERSE™" dispersing aid for acid additives, "SSO-21E" surfactant, and "SSO-21MW™" surfactant. Other suitable foaming agents and foam stabilizing agents may be included as well, which will be known to those skilled in the art with the benefit of this disclosure. The foaming agent is generally present in fluid of the present invention in an amount in the range of from about 0.1% to about 5% by weight, more preferably in the amount of from about 0.2% to about 1% and most preferably about 0.6%

One advantage of using a foamed aqueous tackifying treatment fluid over a nonfoamed version is that less of the aqueous fluid may be needed, relatively speaking. This may be important in subterranean formations that are water-sensitive. In some embodiments, the foamed aqueous tackifying treatment fluids have a foam quality of about 30% or above. A preferred foam quality level is about 50% or above.

Optionally, the aqueous tackifying treatment fluids (including the foamed treatment fluids) may comprise a gelling agent. Any gelling agent suitable for use in subterranean applications may be used in these fluids, including, but not limited to, natural biopolymers, synthetic polymers, crosslinked gelling agents, viscoelastic surfactants, and the like. Guar and xanthan are examples of suitable gelling agents. A variety of gelling agents can be used in conjunction with the methods and compositions of the present invention, including, but not limited to, hydratable polymers that contain one or more functional groups such as hydroxyl, cis-hydroxyl, carboxylic acids, and derivatives of carboxylic acids, sulfate, sulfonate, phosphate, phosphonate, amino, or amide. In certain exemplary embodiments, the gelling agents may be polymers comprising polysaccharides, and derivatives thereof that contain one or more of these monosaccharide units: galactose, mannose, glucoside, glucose, xylose, arabinose, fructose, glucuronic acid, or pyranosyl sulfate. Examples of suitable polymers include, but are not limited to, guar gum and derivatives thereof, such as hydroxypropyl guar and carboxymethylhydroxypropyl guar, cellulose derivatives, such as hydroxyethyl cellulose, locust bean gum, tara, konjak, tamarind, starch, cellulose, karaya, diutan, scleroglucan, wellan, gellan, xanthan, tragacanth, and carrageenan, and derivatives of all of the above. Additionally, synthetic polymers and copolymers that contain the above-mentioned functional groups may be used. Examples of such synthetic polymers include, but are not limited to, polyacrylate, polymethacrylate, polyacrylamide, polyvinyl alcohol, and polyvinylpyrrolidone. In other exemplary embodiments, the gelling agent molecule may be depolymerized. The term "depolymerized," as used herein, generally refers to a decrease in the molecular weight of the gelling agent molecule. Depolymerized gelling agent molecules are described in U.S. Pat. No. 6,488,091 issued Dec. 3, 2002 to Weaver, et al., the relevant disclosure of which is incorporated herein by reference. Suitable gelling agents generally are present in the fluids of the present invention in an amount in the range of from about 0.1% to about 5% by weight of the aqueous fluid therein. In certain exemplary embodiments, the gelling agents are present in the fluids of the present invention in an amount in the range of from about 0.01% to about 2% by weight of the aqueous fluid therein. If a gelling agent is used, a suitable breaker may be necessary to ultimately reduce the viscosity of the fluid. Any breaker suitable for the subterranean formation and the gelling agent may be used. One of ordinary skill in the art with the benefit of this disclosure will recognize appropriate breakers to include.

2. Suitable Curable Resin Compositions.

The curable resin compositions suitable for use in the methods of the present invention comprise a resin and a solvent.

Resins suitable for use in the curable resin compositions of the present invention include all resins known in the art that are capable of forming a consolidating formation fines into a stabilized mass. Many such resins are commonly used in subterranean consolidation operations, and some suitable resins include two component epoxy based resins, novolak resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, polyester resins and hybrids and copolymers thereof, polyurethane resins and hybrids and copolymers thereof, acrylate resins, and mixtures thereof. Some suitable resins, such as epoxy resins, may be cured with an internal catalyst or activator so that when pumped down hole, they may be cured using only time and temperature. Other suitable resins, such as furan resins generally require a time-delayed catalyst or an external catalyst to help activate the polymerization of the resins if the cure temperature is low (i.e., less than 250° F.), but will cure under the effect of time and temperature if the formation temperature is above about 250° F., preferably above about 300° F. It is within the ability of one skilled in the art, with the benefit of this disclosure, to select a suitable resin for use in embodiments of the present invention and to determine whether a catalyst is required to trigger curing.

The curable resin compositions suitable for use in the methods of the present invention preferably have a viscosity of about 1 cP to about 100 cP, more preferably a viscosity of 20 cP or less, and most preferably a viscosity of 10 cP or less. Although these resin compositions are especially preferred for use in the methods of the present invention due to, inter alia, pumping considerations, the formation conditions, viscosity, cost, and safety issues, any suitable resin should work.

Selection of a suitable resin may be affected by the temperature of the subterranean formation to which the fluid will be introduced. By way of example, for subterranean formations having a bottom hole static temperature ("BHST") ranging from about 60° F. to about 250° F., two-component epoxy-based resins comprising a hardenable resin component and a hardening agent component containing specific hardening agents may be preferred. For subterranean formations having a BHST ranging from about 300° F. to about 600° F., a furan-based resin may be preferred. For subterranean formations having a BHST ranging from about 200° F. to about 400° F., either a phenolic-based resin or a one-component HT epoxy-based resin may be suitable. For subterranean formations having a BHST of at least about 175° F., a phenol/phenol formaldehyde/furfuryl alcohol resin may also be suitable.

Any solvent that is compatible with the chosen resin and achieves the desired viscosity effect is suitable for use in the present invention. Some preferred solvents are those having high flash points (e.g., about 125° F.) because of, among other things, environmental and safety concerns. Such solvents include butyl lactate, butylglycidyl ether, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, methanol, butyl alcohol, d-limonene, fatty acid methyl esters, and combinations thereof. Other preferred solvents include aqueous dissolvable solvents such as, methanol, isopropanol, butanol, glycol ether solvents, and combinations thereof. Suitable glycol ether solvents include, but are not limited to, diethylene glycol methyl ether, dipropylene glycol methyl ether, 2-butoxy ethanol, ethers of a $C_2$ to $C_6$ dihydric alkanol containing at least one $C_1$ to $C_6$ alkyl group, mono ethers of dihydric alkanols, methoxypropanol, butoxyethanol, hexoxyethanol, and isomers thereof. Selection of an appropriate solvent is dependent on the resin chosen and is within the ability of one skilled in the art with the benefit of this disclosure.

Regardless of the curable resin composition chosen, its viscosity should preferably be controlled to ensure that it is able to sufficiently penetrate the subterranean formation. A preferred depth of treatment may be from about one to about three well bore diameters; however, the laminate and/or non-uniform makeup of the formation, i.e., shale-sandstone-shale-sandstone, etc., may make reaching such a depth unrealistic. In some embodiments of the present invention, the curable resin composition should penetrate at least about 0.5 inches into the walls of the well bore. Ultra-thin curable resins are preferred.

When penetrating a proppant pack, the resin composition preferably should not penetrate the entire pack; from an economic point of view, preferably just the portion of the proppant pack closest to the well bore should be contacted by the resin composition. One should be mindful, however, that the proppant pack should have sufficient adhesion or consolidation strength to withstand high velocities associated with producing fluids.

3. Suitable Noncurable Resin Compositions

One type of noncurable resin compositions suitable for use comprises polyamides that are liquids or in solution at the temperature of the subterranean formation such that they are, by themselves, non-hardening when introduced into the subterranean formation. A particularly preferred product is a condensation reaction product comprised of commercially available polyacids and a polyamine. Such commercial products include compounds such as mixtures of $C_{36}$ dibasic acids containing some trimer and higher oligomers and also small amounts of monomer acids that are reacted with polyamines. Other polyacids include trimer acids, synthetic acids produced from fatty acids, maleic anhydride, acrylic acid, and the like. Such acid compounds are commercially available from companies such as Witco Corporation, Union Camp, Chemtall, and Emery Industries. The reaction products are available from, for example, Champion Technologies, Inc. and Witco Corporation. Additional compounds which may be used as noncurable resin compositions include liquids and solutions of, for example, polyesters, polycarbonates and polycarbamates, natural resins such as shellac and the like. Other suitable noncurable resin compositions are described in U.S. Pat. No. 5,853,048 issued to Weaver, et al. and U.S. Pat. No. 5,833,000 issued to Weaver, et al., the relevant disclosures of which are herein incorporated by reference.

Noncurable resin compositions suitable for use in the present invention may be either used such that they form non-hardening coating or they may be combined with a multifunctional material capable of reacting with the noncurable resin compositions to form a hardened coating. A "hardened coating" as used herein means that the reaction of the tackifying compound with the multifunctional material will result in a substantially non-flowable reaction product that exhibits a higher compressive strength in a consolidated agglomerate than the tackifying compound alone with the particulates. In this instance, the noncurable resin composition may function similarly to a hardenable resin. Multifunctional materials suitable for use in the present invention include, but are not limited to, aldehydes such as formaldehyde, dialdehydes such as glutaraldehyde, hemiacetals or aldehyde releasing compounds, diacid halides, dihalides such as dichlorides and dibromides, polyacid anhydrides such as citric acid, epoxides, furfuraldehyde, glutaraldehyde or aldehyde condensates and the like, and combinations thereof. In some embodiments of the present invention, the multifunctional material may be mixed with the tackifying compound in an amount of from about 0.01 to about 50 percent by weight of the tackifying compound to effect formation of the reaction product. In some preferable embodiments, the compound is present in an amount of from about 0.5 to about 1 percent by weight of the tackifying compound. Suitable multifunctional materials are described in U.S. Pat. No. 5,839,510 issued to Weaver, et al., the relevant disclosure of which is herein incorporated by reference.

Solvents suitable for use with the noncurable resin compositions include any solvent that is compatible with a particular or chosen noncurable resin composition and achieves the desired viscosity effect. The solvents that can be used in the present invention preferably include those having high flash points (most preferably above about 125° F.). Examples of solvents suitable for use in the present invention include, but are not limited to, butylglycidyl ether, dipropylene glycol methyl ether, butyl bottom alcohol, dipropylene glycol dimethyl ether, diethyleneglycol methyl ether, ethyleneglycol butyl ether, methanol, butyl alcohol, isopropyl alcohol, diethyleneglycol butyl ether, propylene carbonate, d-limonene, 2-butoxy ethanol, butyl acetate, furfuryl acetate, butyl lactate, dimethyl sulfoxide, dimethyl formamide, fatty acid methyl esters, and combinations thereof. It is within the ability of one skilled in the art, with the benefit of this disclosure, to determine whether a solvent is needed to achieve a viscosity suitable to the subterranean conditions and, if so, how much.

Optionally, silyl-modified polyamide compounds may be used in the methods of the present invention as noncurable resin compositions, and may be described as substantially self-hardening compositions that are capable of at least partially adhering to particulates in the unhardened state, and that are further capable of self-hardening themselves to a substantially non-tacky state to which individual particulates such as formation fines will not adhere to, for example, in formation or proppant pack pore throats. Such silyl-modified polyamides may be based, for example, on the reaction product of a silating compound with a polyamide or a mixture of polyamides. The polyamide or mixture of polyamides may be one or more polyamide intermediate compounds obtained, for example, from the reaction of a polyacid (e.g., diacid or higher) with a polyamine (e.g., diamine or higher) to form a polyamide polymer with the elimination of water. Other suitable silyl-modified polyamides and methods of making such compounds are described in U.S. Pat. No. 6,439,309 issued to Matherly, et al., the relevant disclosure of which is herein incorporated by reference.

B. The Proactive Methods of the Present Invention.

The proactive methods are most suited for wells that have not been actively fractured yet. These methods can be used as a pre-treatment, such as in a "mini-frac treatment," before the main fracturing treatment or at the early stage of a fracturing treatment such as a pre-pad treatment or part of a pad fluid applied before the main proppant slurry treatment.

The proactive methods of the present invention comprise three steps. The first step is placing an aqueous tackifying treatment fluid before or as part of a pre-pad of a fracturing treatment. The second step involves fracturing a portion of the subterranean formation. This fracturing step may include the introduction of some proppant into the formation. This proppant may be coated with a resin composition, uncoated, or a combination thereof (i.e., some coated, then some uncoated, and so on). The third step involves introducing at least some coated proppant during the fracturing treatment into the fractures created in the fracturing treatment. In some embodiments, from an economic point of view, it is preferable to introduce the coated proppant at the end of the fracturing treatment. The proppant may form proppant packs in the fractures. All three steps may be performed with one or more fluid systems.

In other embodiments, the proactive methods of controlling particulates within a subterranean formation of the present invention comprise the steps of: placing an aqueous tackifying treatment fluid or a resin composition into a propped fracture that comprises proppant particulates; placing an aqueous tackifying treatment fluid into the propped fracture; and allowing the proppant particulates to form a permeable proppant pack. If desired, a spacer fluid or other treatment fluid (such as scale inhibitors, brines, etc.) may be used before the aqueous tackifying treatment fluid is introduced.

The same aqueous tackifying treatment fluids (discussed in section A1), curable resin compositions (discussed in section A2), and noncurable resin compositions (discussed in section A3) as discussed above with respect to the remedial methods of the present invention may be used in the proactive methods of the present invention as discussed.

2. Suitable Fracturing Processes.

Any suitable fracturing process may be used in conjunction with the methods of the present invention. Suitable fracturing processes may involve fracturing fluids that comprise gelling agents, foams, and/or surfactants. These processes also may involve coiled tubing, jetting, acoustical tools, or other suitable methods for placing the fracturing fluid in the desired subterranean zone.

3. Introducing Coated Proppant.

The coated proppant may be introduced as part of the fracturing process, at any point during the process. Preferably, the coated proppant is introduced towards the end of the fracturing treatment. The term "coated proppant" as used herein means proppant particulates that have been at least partially coated with a suitable resin. The proppant particulates may be coated with the resin by any suitable method. The term "coated" does not imply any particular degree of coverage of the proppant particulates with the resin.

A wide variety of particulate materials may be used as proppant in accordance with the present invention, including, but not limited to, sand; bauxite; ceramic materials; glass materials; resin precoated proppant (commercially available from Borden Chemicals and Santrol, for example, both from Houston, Tex.); polymer materials; "TEFLON™" materials; ground or crushed nut shells; ground or crushed seed shells; ground or crushed fruit pits; processed wood; composite particulates prepared from a binder with filler particulate including silica, alumina, fumed carbon, carbon black, graphite, mica, titanium dioxide, meta-silicate, calcium silicate, kaolin, talc, zirconia, boron, fly ash, hollow glass microspheres, and solid glass; or mixtures thereof. The proppant used may have a particle size in the range of from about 2 to about 400 mesh, U.S. Sieve Series. Preferably, the proppant is graded sand having a particle size in the range of from about 10 to about 70 mesh, U.S. Sieve Series. Preferred sand particle size distribution ranges are one or more of 10-20 mesh, 20-40 mesh, 40-60 mesh or 50-70 mesh, depending on the particle size and distribution of the formation particulates to be screened out by the proppant.

The same aqueous tackifying treatment fluids (discussed in section A1), curable resin compositions (discussed in section A2), and noncurable resin compositions (discussed in section A3) as discussed above with respect to the remedial methods of the present invention may be used to coat proppant in these embodiments of the present invention.

To facilitate a better understanding of the present invention, the following examples of certain aspects of some embodiments are given. In no way should the following examples be read to limit, or define, the scope of the invention.

EXAMPLES

Fines of Brazos River sand with sieve size of 200-mesh and smaller were used to simulate formation fines. Seven grams of this formation fines material was mixed with 10 grams of 20/40-mesh Ottawa sand. The mixture was packed inside a 1-inch ID transparent acrylic flow cell for ease of observation. Ottawa sand with mesh size of 40/60 mesh was packed below and 12/20-mesh Brady sand was packed above this formation fines material. The sand column was then saturated with 3% KCl brine and then flushed with 4 pore volumes of treatment fluid comprising of (0.1% HY-CLEAN (HC-2) Surfactant (available from Halliburton Energy Services, Duncan, Okla.), 0.2% 19N Surfactant (available from Halliburton Energy Services, Duncan, Okla.), 5% activator (acetic acid/acetic anhydride blend), 1% polymer (40% solution of a polyacrylate ester polymer), and 94.3% water. The treated sand column was then placed in the oven for curing at 175° F. for 2 hours. After the curing period, flow using 3% KCl brine was established through the treated sand column with an opposite direction from that during treatment. Flow rate was started at 20 mL/min and incrementally increased to 80 mL/min. Effluents were collected for total solid analysis to help determine if fines was effectively controlled by the aqueous tackifying compound treatment. To help determine the impact of cure time at temperature, similar tests were performed, however, the cure time was increased to 4 hours and 16 hours (Table 1).

For comparison purpose with a control sample, an identical sand column was prepared, but treatment fluid was not applied and without curing at 175° F. It was observed that as soon as flow was established, fines particulate immediately began to migrate into the sand pack and produced out as part of the effluent, even at 10 mL/min. Effluents were also collected for total solid analysis (Table 1).

The results all indicated that the aqueous tackifying compound treatment was able to control fines migration at cure time longer than 2 hours and all treated columns showed improvement in fines control in comparing to that of the control (i.e., untreated column) (Table 1).

TABLE 1

| Flow Rate mL/min | Total Suspended Solids Control | Total Suspended Solids 2 Hour Curing Time | Total Suspended Solids 4 Hour Curing Time | Total Suspended Solids 6 Hour Curing Time |
|---|---|---|---|---|
| 20 | 69.4 | 38.1 | 85.6 | 3.1 |
| 40 | 139.4 | 20.8 | 10.2 | 14.1 |
| 80 | 1320 | 245.9 | 78.4 | 61.6 |
| 100 | 868.2 | 114.4 | 39 | 35.7 |

Therefore, the present invention is well adapted to attain the ends and advantages mentioned as well as those that are inherent therein. While numerous changes may be made by those skilled in the art, such changes are encompassed within the spirit of this invention as defined by the appended claims. The terms in the claims have their plain, ordinary meaning unless otherwise explicitly and clearly defined by the patentee.

What is claimed is:

1. A remedial method of controlling particulates within a subterranean formation comprising:
    first, placing a liquid resin composition into an unconsolidated zone of a subterranean formation such that the liquid resin penetrates into the subterranean formation to a distance of from about one to about three wellbore diameters; and
    second, placing an aqueous tackifying treatment fluid that comprises an aqueous tackifying agent into the unconsolidated zone;
        wherein the aqueous tackifying agent is selected from the group consisting of: poly(methyl acrylate); poly(butyl acrylate); poly(2-ethylhexyl acrylate); a methacrylic acid derivative polymer; a methacrylic acid homopolymer; a methacrylic acid ester homopolymer; poly(methyl methacrylate); poly(butyl methacrylate); poly(2-ethylhexyl methacrylate); an acrylamido-methyl-propane sulfonate derivative polymer; an acrylic acid/acrylamido-methyl-propane sulfonate co-polymer; and any combination thereof.

2. The method of claim 1 wherein the resin comprises at least one curable resin selected from the group consisting of: a two component epoxy based resin; a novolak resin; a polyepoxide resin; a phenol-aldehyde resin; a urea-aldehyde resin; a urethane resin; a phenolic resin; a furan resin; a furan/furfuryl alcohol resin; a phenolic/latex resin; a phenol formaldehyde resin; a polyester resin; a hybrid polyester resin; a polyester copolymer resin; a polyurethane resin; a hybrid polyurethane resin; a polyurethane copolymer resin; an acrylate resin; and any combination thereof.

3. The method of claim 1 wherein the resin composition comprises at least one noncurable resin selected from the group consisting of: a condensation reaction product comprised of a polyacid and a polyamine; a polyamine; a polyacid; a trimer acid; a synthetic acid produced from a fatty acid; maleic anhydride; acrylic acid; a polyester; a polycarbonate; a polycarbamate; a natural resin; shellac; an aldehyde; formaldehyde; a dialdehyde; glutaraldehyde; a hemiacetal; an aldehyde releasing compound; a diacid halide; a dihalide; a dichloride; a dibromide; a polyacid anhydride; citric acid; an epoxide; furfuraldehyde; an aldehyde condensate; a silyl-modified polyamide; and any combination thereof.

4. The method of claim 1 wherein the resin composition has a viscosity of about 100 centipoise or less.

5. The method of claim 1 wherein the resin composition further comprises at least one solvent selected from the group consisting of: butyl lactate; butylglycidyl ether; dipropylene glycol methyl ether; dipropylene glycol dimethyl ether; dimethyl formamide; diethyleneglycol methyl ether; ethyleneglycol butyl ether; diethyleneglycol butyl ether; propylene carbonate; methanol; butyl alcohol; d-limonene; a fatty acid methyl ester; an aqueous dissolvable solvent; methanol; isopropanol; butanol; a glycol ether solvent; diethylene glycol methyl ether; dipropylene glycol methyl ether; 2-butoxy ethanol; an ether of a $C_2$ to $C_6$ dihydric alkanol containing at least one $C_1$ to $C_6$ alkyl group; a mono ether of dihydric alkanol; methoxypropanol; butoxyethanol; hexoxyethanol; and any combination thereof.

6. The method of claim 1 wherein the resin composition further comprises at least one solvent selected from the group consisting of: butylglycidyl ether; dipropylene glycol methyl ether; butyl bottom alcohol; dipropylene glycol dimethyl ether; diethylene methyl ether; ethyleneglycol butyl ether; methanol; butyl alcohol; isopropyl alcohol; diethyleneglycol butyl ether; propylene carbonate; d-limonene; 2-butoxy ethanol; butyl acetate; furfuryl acetate; butyl lactate; dimethyl sulfoxide; dimethyl formamide; a fatty acid methyl ester; and any combination thereof.

7. The method of claim 1 wherein the aqueous tackifying treatment fluid further comprises at least one element selected from the group consisting of: a gelling agent; a scale inhibitor; a breaker; an enzyme; a surfactant; a gas; a foaming agent; a solvent; an activator; and any combination thereof.

8. A remedial method of controlling particulates within a subterranean formation comprising:
first, placing a liquid resin composition into an unconsolidated zone of a subterranean formation, the resin composition comprising a curable resin and a solvent such that the liquid resin penetrates into the subterranean formation to a distance of from about one to about three wellbore diameters;
wherein the curable resin selected from the group consisting of: a two component epoxy based resin; a novolak resin; a polyepoxide resin; a phenol-aldehyde resin; a urea-aldehyde resin; a urethane resin; a phenolic resin; a furan resin; a furan/furfuryl alcohol resin; a phenolic/latex resin; a phenol formaldehyde resin; a polyester resin; a hybrid polyester resin; a polyester copolymer resin; a polyurethane resin; a hybrid polyurethane resin; a polyurethane copolymer resin; an acrylate resin; and any combination thereof;
wherein the solvent is selected from the group consisting of: butyl lactate; butylglycidyl ether; dipropylene glycol methyl ether; dipropylene glycol dimethyl ether; dimethyl formamide; diethyleneglycol methyl ether; ethyleneglycol butyl ether; diethyleneglycol butyl ether; propylene carbonate; methanol; butyl alcohol; d-limonene; a fatty acid methyl ester; an aqueous dissolvable solvent; methanol; isopropanol; butanol; a glycol ether solvent; diethylene glycol methyl ether; dipropylene glycol methyl ether; 2-butoxy ethanol; an ether of a $C_2$ to $C_6$ dihydric alkanol containing at least one $C_1$ to $C_6$ alkyl group; a mono ether of dihydric alkanol; methoxypropanol; butoxyethanol; hexoxyethanol; and any combination thereof; and,
second, placing an aqueous tackifying treatment fluid that comprises an aqueous tackifying agent into the unconsolidated zone;
wherein the aqueous tackifying agent is selected from the group consisting of: poly(methyl acrylate); poly(butyl acrylate); poly(2-ethylhexyl acrylate); a methacrylic acid derivative polymer; a methacrylic acid homopolymer; a methacrylic acid ester homopolymer; poly(methyl methacrylate); poly(butyl methacrylate); poly(2-ethylhexyl methacrylate); an acrylamido-methyl-propane sulfonate derivative polymer; an acrylic acid/acrylamido-methyl-propane sulfonate co-polymer; and any combination thereof.

9. The method of claim 8 wherein the resin composition has a viscosity of about 100 centipoise or less.

10. The method of claim 8 wherein the aqueous tackifying treatment fluid further comprises at least one element selected from the group consisting of: a gelling agent; a scale inhibitor; a breaker; an enzyme; a surfactant; a gas; a foaming agent; a solvent; an activator; and any combination thereof.

11. A remedial method of controlling particulates within a subterranean formation comprising:
first, placing a liquid resin composition into an unconsolidated zone of a subterranean formation, the resin composition comprising a noncurable resin and a solvent such that the liquid resin penetrates into the subterranean formation to a distance of from about one to about three wellbore diameters; and
wherein the noncurable resin selected from the group consisting of: a condensation reaction product comprised of a polyacid and a polyamine; a polyamine; a polyacid; a trimer acid; a synthetic acid produced from a fatty acid; maleic anhydride; acrylic acid; a polyester; a polycarbonate; a polycarbamate; a natural resin; shellac; an aldehyde; formaldehyde; a dialdehyde; glutaraldehyde; a hemiacetal; an aldehyde releasing compound; a diacid halide; a dihalide; a dichloride; a dibromide; a polyacid anhydride; citric acid; an epoxide; a furfuraldehyde; an aldehyde condensate; a silyl-modified polyamide; and any combination thereof;
wherein the solvent is selected from the group consisting of: butylglycidyl ether; dipropylene glycol methyl ether; butyl bottom alcohol; dipropylene glycol dimethyl ether; diethylene methyl ether; ethyleneglycol butyl ether; methanol; butyl alcohol; isopropyl alcohol; diethyleneglycol butyl ether; propylene carbonate; d-limonene; 2-butoxy ethanol; butyl acetate; furfuryl acetate; butyl lactate; dimethyl sulfoxide; dimethyl formamide; a fatty acid methyl ester; and any combination thereof; and,
second, placing an aqueous tackifying treatment fluid that comprises an aqueous tackifying agent into the unconsolidated zone;
wherein the aqueous tackifying agent is selected from the group consisting of: poly(methyl acrylate); poly(butyl acrylate); poly(2-ethylhexyl acrylate); a methacrylic acid derivative polymer; a methacrylic acid homopolymer; a methacrylic acid ester homopolymer; poly(methyl methacrylate); poly(butyl methacrylate); poly(2-ethylhexyl methacrylate); an acrylamido-methyl-propane sulfonate derivative polymer; an acrylic acid/acrylamido-methyl-propane sulfonate co-polymer; and any combination thereof.

12. The method of claim 11 wherein the resin composition has a viscosity of about 100 centipoise or less.

13. The method of claim 11 wherein the aqueous tackifying treatment fluid further comprises at least one element selected from the group consisting of: a gelling agent; a scale inhibitor; a breaker; an enzyme; a surfactant; a gas; a foaming agent; a solvent; an activator; and any combination thereof.

* * * * *